United States Patent
Kang

(10) Patent No.: US 9,912,972 B2
(45) Date of Patent: Mar. 6, 2018

(54) SERVER AND CLIENT PROCESSING MULTIPLE SETS OF CHANNEL INFORMATION AND CONTROLLING METHOD OF THE SAME

(71) Applicant: LG ELECTRONICS INC., Seoul (KR)

(72) Inventor: Seungwoo Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/149,324

(22) Filed: Jan. 7, 2014

(65) Prior Publication Data

US 2014/0196095 A1 Jul. 10, 2014

(30) Foreign Application Priority Data

Jan. 9, 2013 (KR) .................. 10-2013-0002458

(51) Int. Cl.

| | |
|---|---|
| *H04N 21/2368* | (2011.01) |
| *H04N 21/482* | (2011.01) |
| *H04N 21/431* | (2011.01) |
| *H04N 21/434* | (2011.01) |
| *H04N 21/84* | (2011.01) |

(52) U.S. Cl.
CPC ..... *H04N 21/2368* (2013.01); *H04N 21/4316* (2013.01); *H04N 21/4348* (2013.01); *H04N 21/482* (2013.01); *H04N 21/84* (2013.01)

(58) Field of Classification Search
CPC .......... H04N 21/2368; H04N 21/4316; H04N 21/4348; H04N 21/482; H04N 21/84
See application file for complete search history.

(56) References Cited

U.S. PATENT DOCUMENTS

| | | |
|---|---|---|
| 6,002,444 A | 12/1999 | Marshall et al. |
| 8,635,649 B2* | 1/2014 | Ward, III .................. 725/32 |
| 2006/0039481 A1* | 2/2006 | Shen et al. ............ 375/240.25 |
| 2009/0199241 A1 | 8/2009 | Unger et al. |

(Continued)

FOREIGN PATENT DOCUMENTS

| | | |
|---|---|---|
| CN | 1449625 A | 10/2003 |
| CN | 1726699 A | 1/2006 |
| CN | 102742291 A | 10/2012 |

(Continued)

*Primary Examiner* — Rong Le
(74) *Attorney, Agent, or Firm* — Birch, Stewart, Kolasch & Birch, LLP

(57) ABSTRACT

A technical method related to a server and a client processing multiple sets of channel information is disclosed. Herein, An apparatus of processing multiple channel information according to an exemplary embodiment of the present invention includes a decoder decoding encoded data received from a server, a demultiplexer demultiplexing video data, audio data and metadata for each channel from the decoded data, a controller extracting video data, audio data and metadata for a channel group for on-screen display (OSD) data, the channel group including one or more channels, an OSD generator generating OSD data based on the extracted video data, audio data and metadata for the channel group, and a display module displaying the generated OSD data on a predetermined section along with a broadcast screen of a currently selected channel.

3 Claims, 14 Drawing Sheets

(56) References Cited

U.S. PATENT DOCUMENTS

2009/0307731 A1* 12/2009 Beyabani .................. 725/87
2011/0134325 A1* 6/2011 Ahn ........................ 348/569

FOREIGN PATENT DOCUMENTS

| EP | 2 400 756 A2 | 12/2011 | |
|---|---|---|---|
| WO | WO 02/01879 A2 | 1/2002 | |
| WO | WO 0201879 A2 * | 1/2002 | ........... H04N 5/4401 |
| WO | WO 2004/056098 A1 | 7/2004 | |

* cited by examiner

FIG. 6
(a)
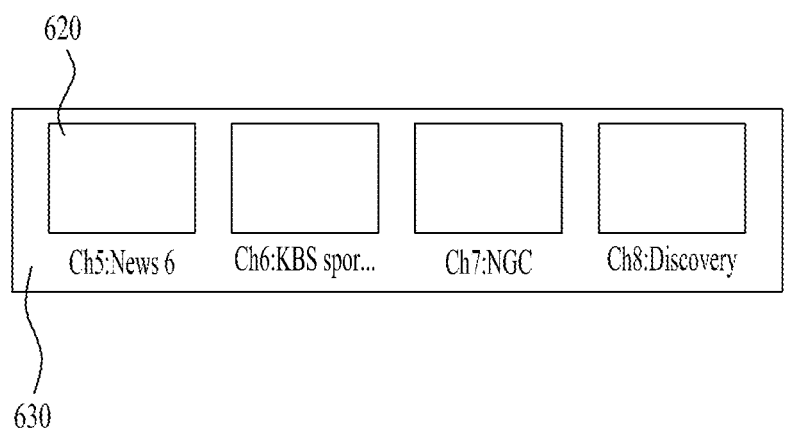
(b)

FIG. 8
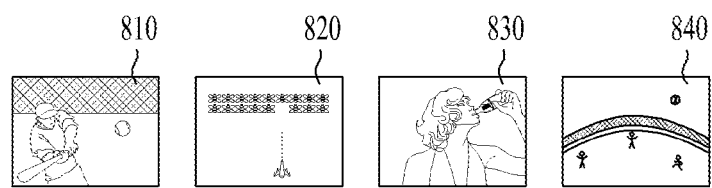
(a)
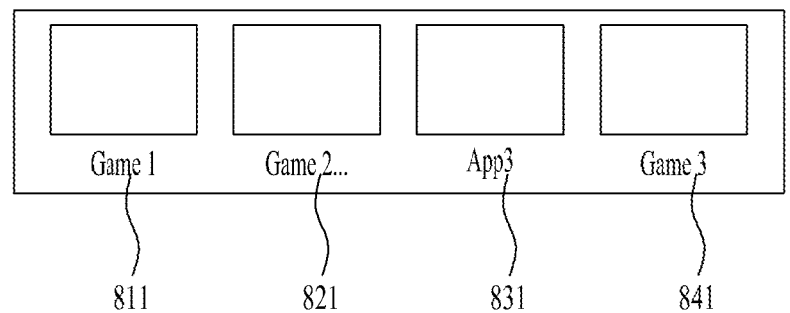
(b)

FIG. 12

| Profile DB (2012.11.1 ~ 2012.12.1) ||||
|---|---|---|---|
| Channel Number | Access Times | Viewing Time | Priority Level |
| 1 | 2 times | 40 mins | 3 |
| 2 | 3 times | 1 hrs. 25 mins | 2 |
| 3 | 1 times | 2 hrs | 1 |
| 4 | 5 times | 17 mins | 4 |
| ⋮ | ⋮ | ⋮ | ⋮ |

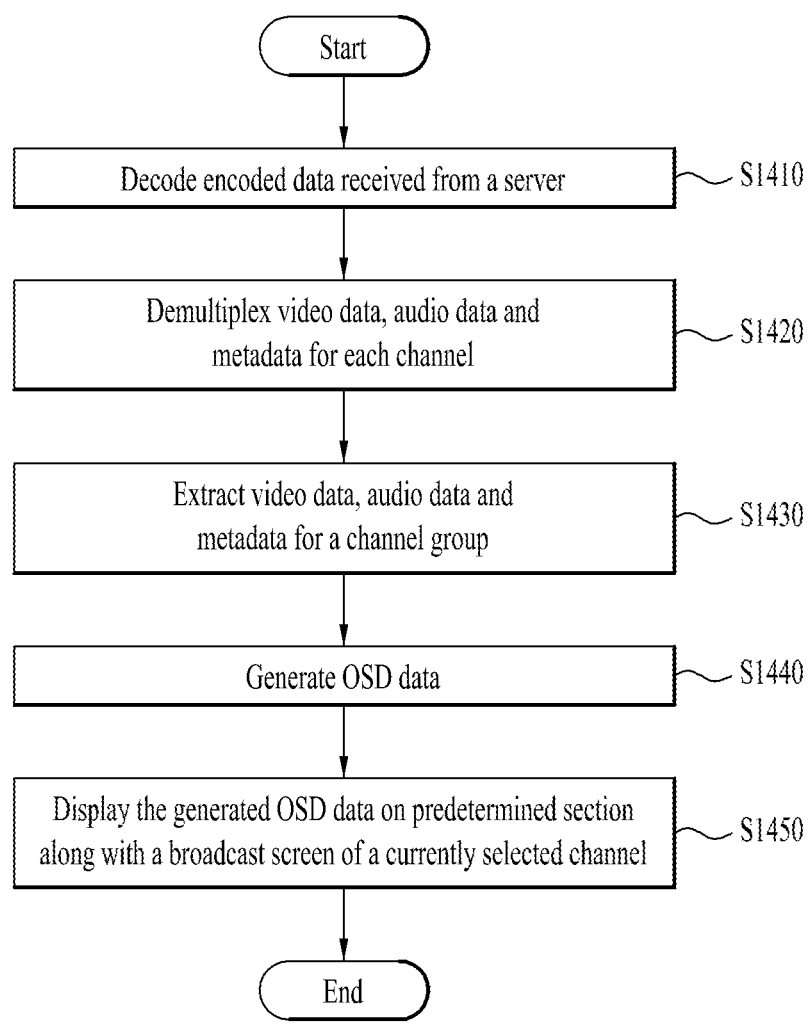

SERVER AND CLIENT PROCESSING MULTIPLE SETS OF CHANNEL INFORMATION AND CONTROLLING METHOD OF THE SAME

This application claims the benefit of the Korean Patent Application No. 10-2013-0002458, filed on Jan. 9, 2013, which is hereby incorporated by reference as if fully set forth herein.

BACKGROUND OF THE INVENTION

Field of the Invention

The present invention relates to a technology associated with a client and a server and, more particularly, to a client and server for processing multiple sets of channel information and a method for controlling the same. Herein, for example, the client may correspond to any one of a DTV, an Internet Protocol Television (IPTV), a network TV, an HBBTV, a smart TV and a mobile device.

Discussion of the Related Art

With the recent development and evolution in the communication technology and electronic technology, clients that are capable of quickly processing a wider range of functions are being presented. For example, smart TVs capable of processing the conventional broadcast data as well as IP packet data that are being received through the Internet are being supplied.

Furthermore, due to an expansion in cable broadcasting, Internet broadcasting, and so on, the number of channels available for a user to access through a single device has vastly increased from several hundreds of channels to several thousands of channels. However, due to an excessive number of available channels, a considerable amount of time is consumed for selecting a particular channel that is wanted (or requested) by the user. And, moreover, some random channel may be not be accessed at all.

SUMMARY OF THE INVENTION

Accordingly, the present invention is directed to a server and a client processing multiple sets of channel information and controlling method of the same that substantially obviate one or more problems due to limitations and disadvantages of the related art.

An object of the present invention is to provide a separate management server for providing channel information optimized for the client (i.e., client-optimized channel information).

Another object of the present invention is to provide a technology for preventing data processing overload of the client from occurring in advance during a procedure of providing a considerable amount of channel information to the client.

A further object of the present invention is to define a solution for automatically grouping channels preferred by the user, and for providing multiple sets of channel information in a user interface format of video data and not simply providing supplemental information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting multiple channel information in a server, includes the steps of scanning multiple channels, so as to receive video data and audio data for each channel, multiplexing the received video data and audio data for each channel, encoding the overall multiplexed data, transmitting the encoded overall data to a client through a first communication path, and transmitting metadata respective each channel to the client through a second communication path.

Additionally, according to another exemplary embodiment of the present invention, a method of processing multiple channel information in a broadcast receiver includes the steps of decoding encoded data received from a server, demultiplexing video data, audio data and metadata for each channel from the decoded data, extracting video data, audio data and metadata for a channel group for on-screen display (OSD) data, the channel group including one or more channels, generating OSD data based on the extracted video data, audio data and metadata for the channel group, and displaying the generated OSD data on a predetermined section along with a broadcast screen of a currently selected channel.

Finally, according to yet another exemplary embodiment of the present invention, an apparatus of processing multiple channel information includes a decoder decoding encoded data received from a server, a demultiplexer demultiplexing video data, audio data and metadata for each channel from the decoded data, a controller extracting video data, audio data and metadata for a channel group for on-screen display (OSD) data, the channel group including one or more channels, an OSD generator generating OSD data based on the extracted video data, audio data and metadata for the channel group, and a display module displaying the generated OSD data on a predetermined section along with a broadcast screen of a currently selected channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a process of blending a video user interface and metadata according to an exemplary embodiment of the present invention;

FIG. 8 illustrates a process of blending a video user interface and metadata according to another exemplary embodiment of the present invention;

FIG. 12 illustrates a database that is stored in a memory of the client according to an exemplary embodiment of the present invention;

FIG. 14 illustrates a detailed flow chart showing a control method of a client according to an exemplary embodiment of the present invention.

DETAILED DESCRIPTION OF THE INVENTION

Figure 1:
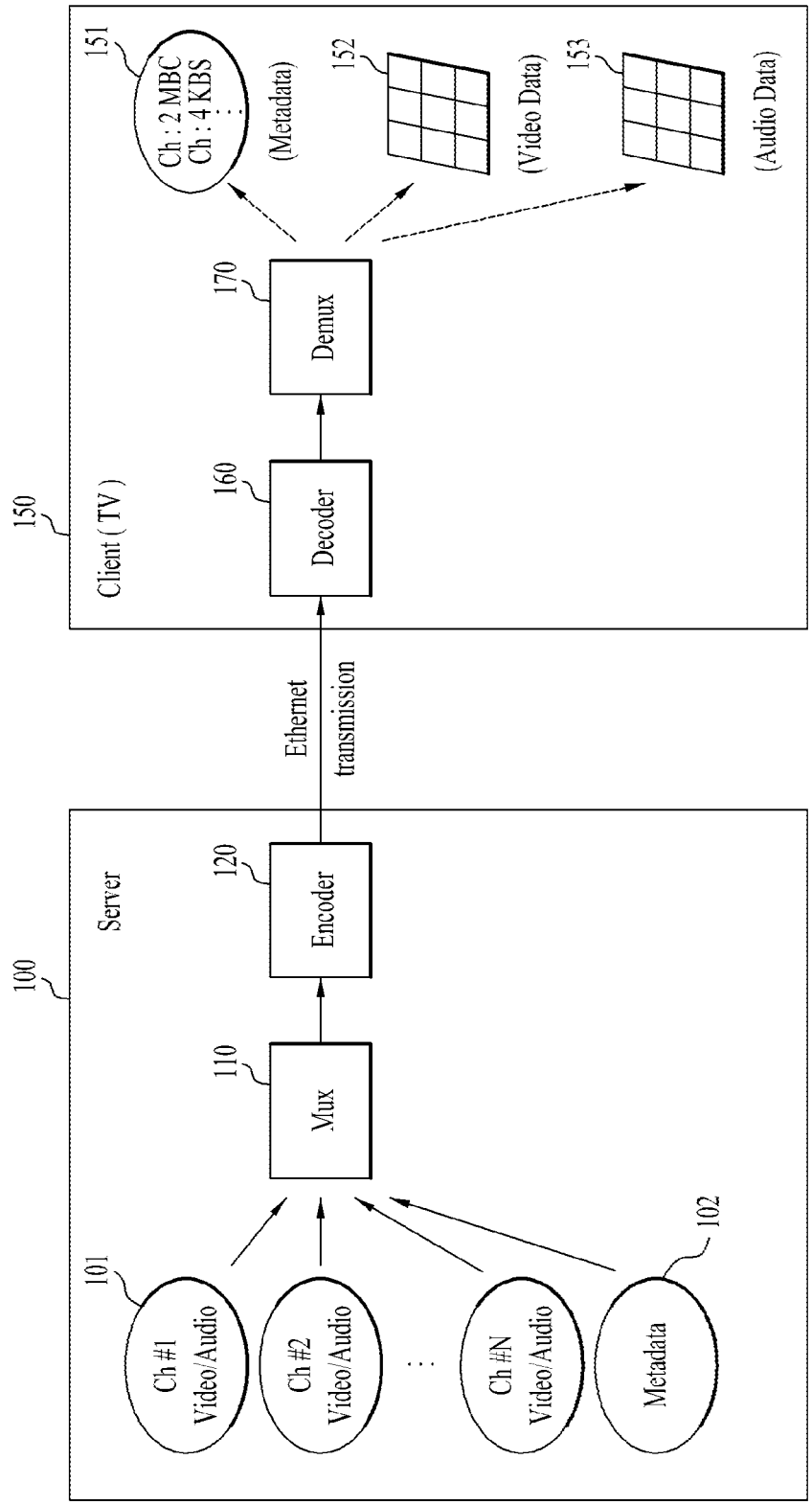
FIG. 1 illustrates a general view showing an overall system including a server and a client according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention will now be described in more detail with reference to the accompanying drawings.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Meanwhile, the client mentioned in the description of the present invention corresponds to, for example, an intelligent electronic device that is also equipped with a computer supporting function in addition to the broadcast program receiving function. Accordingly, since the display device is committed (or devoted) to its broadcast program receiving function and is also supplemented with an internet browsing function, the display device may be equipped with an interface that can be more conveniently used as compared to an hand-writing type input device, a touch screen, a touch pad, or a space remote controller. Furthermore, being supported with a wired or wireless (or radio) internet function, the display device may be connected to (or may access) the internet and a computer, thereby being capable of performing email transmission, web browsing, internet banking or gaming functions. In order to perform such variety of functions, the display device may adopt a standardized operating system (OS) for general purpose.

Accordingly, since a variety of applications may be easily added to or deleted from the display device within an OS kernel for general purpose, the display device described in the description of the present invention may, for example, be capable of performing a wide range of user-friendly functions. More specifically, for example, examples of the client may include a DTV, an Internet Protocol Television (IPTV), a network TV, an HBBTV, a smart TV, or a mobile device.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

FIG. 1 illustrates a general view showing an overall system including a server and a client according to an exemplary embodiment of the present invention. Referring to FIG. 1, an overall process of transmitting and receiving a video user interface and metadata will hereinafter be described in detail. However, in the following description, the system shown in FIG. 1 will be described, and, it will be apparent that, by principle, the scope of the present invention should be decided based upon the appended claims of the present invention.

First of all, according to the exemplary embodiment of the present invention, a server 100 includes a multiplexer 110 and an encoder 120, and a client 150 includes a decoder 160 and a demultiplexer 170.

In order to reduce data processing overload of the client 150 and to enhance data processing speed (or data processing rate) related to channel information, the server 100 receives current video data/audio data 101 of each channel by scanning all channels. Furthermore, the server 100 is also designed to collect metadata 102 related to the current broadcast program of each channel (e.g., channel number, supplemental information related to the current broadcast program).

Therefore, the multiplexer 110 of the server 100 performs multiplexing on (or multiplexes) the video data/audio data 101 and the metadata 102, and the encoder 120 encodes the overall multiplexed data. Herein, the encoding method may be decided based upon a codec performance, and so on, of the client that is to receive the overall data.

Furthermore, the server 100 transmits the overall encoded data to the client 150 via Ethernet. Evidently, although the Ethernet is given as an example in FIG. 1, the scope of the present invention includes designing the present invention so that broadcast channels being unused by a respective broadcasting station can be used.

Meanwhile, the decoder 160 of the client 150 decodes the overall data that are received from the server 100 to a predetermined format, and the demultiplexer 170 divides (or splits) and extracts metadata 151, video data 152 and audio data 153. Therefore, this exemplary embodiment of the present invention is advantageous in that the client 150 is not required to scan each of the several tens to several hundreds of channels one by one, and that the client 150 is capable of verifying video data of other channels in real-time.

Figure 2:
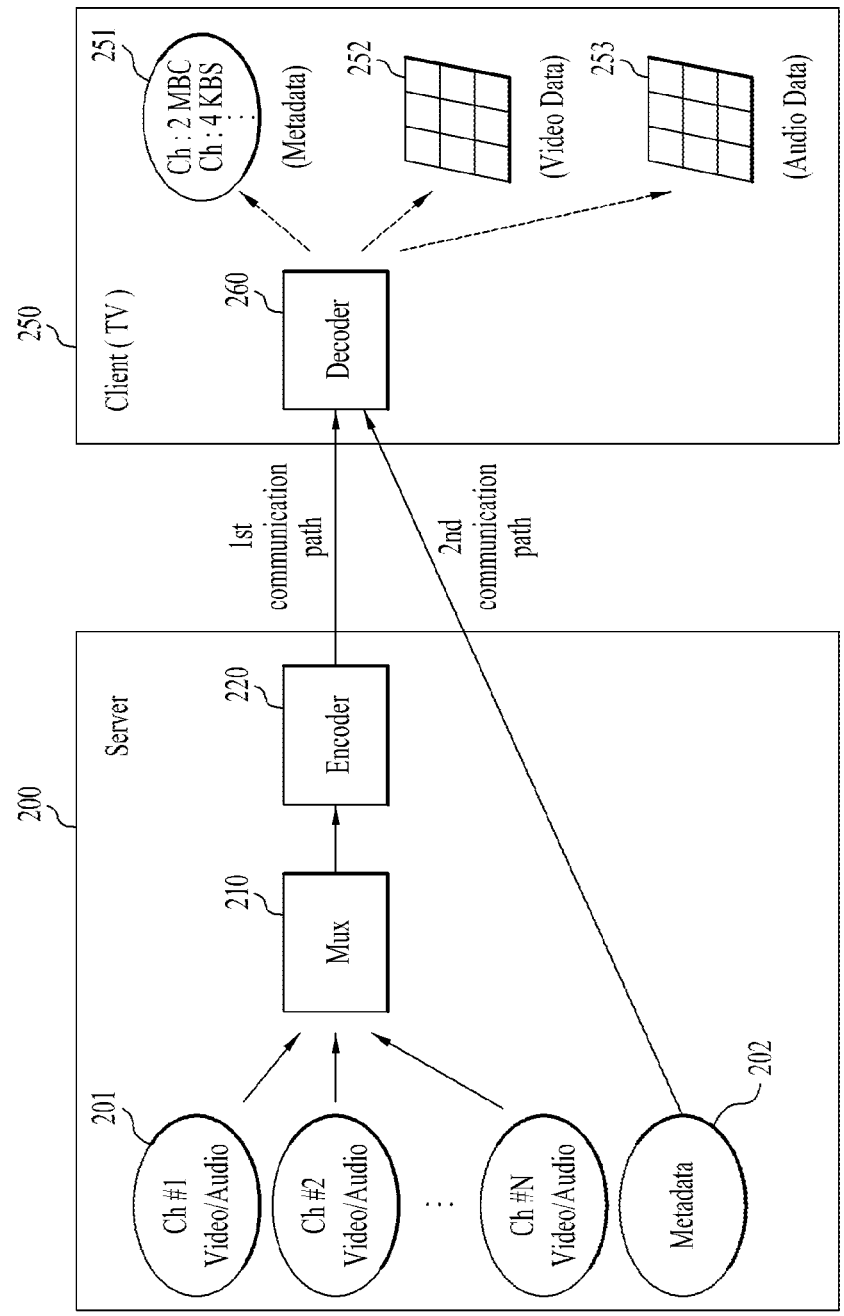
FIG. 2 illustrates a general view showing an overall system including a server and a client according to another exemplary embodiment of the present invention.

FIG. 2 illustrates a general view showing an overall system including a server and a client according to another exemplary embodiment of the present invention. Although FIG. 1 shows an example of multiplexing the video/audio data along with the metadata and then collectively transmitting the multiplexed data, FIG. 2 shows an example of transmitting the video/audio data and the metadata through separate communication paths. Evidently, anyone skilled in the art may supplementarily interpret FIG. 2 with reference to FIG. 1.

First of all, as shown in FIG. 2, the multiplexer 210 of the server 200 multiplexes only video/audio data 201 that are currently being outputted from at least one or more channels and does not multiplex metadata 202.

After being encoded by a predetermined encoding method by the encoder 220, the multiplexed video/audio data are transmitted to the client 250 through a first communication path. Conversely, the metadata 202 are transmitted to the client 250 through a second communication path. Accordingly, unlike in the example shown in FIG. 1, the client 250 shown in FIG. 2 is advantageous in that a demultiplexer is not required to be additionally designed.

Meanwhile, the decoder 260 of the client 250 decodes the video/audio data 201 that are received through the first communication path and the metadata 202 that are received through the second communication path. Thereafter, the decoder 260 respectively converts the decoded data to formats 251, 252 and 253 that can be outputted (or formats available for output).

Additionally, the server 200 and the client 250 corresponds to an exemplary embodiment of the present invention, and a display device, which includes a first module being in charge of a function performed by the server 200 and a second module being in charge of a function performed by the client 250, may also correspond to another exemplary embodiment of the present invention.

Figure 3:
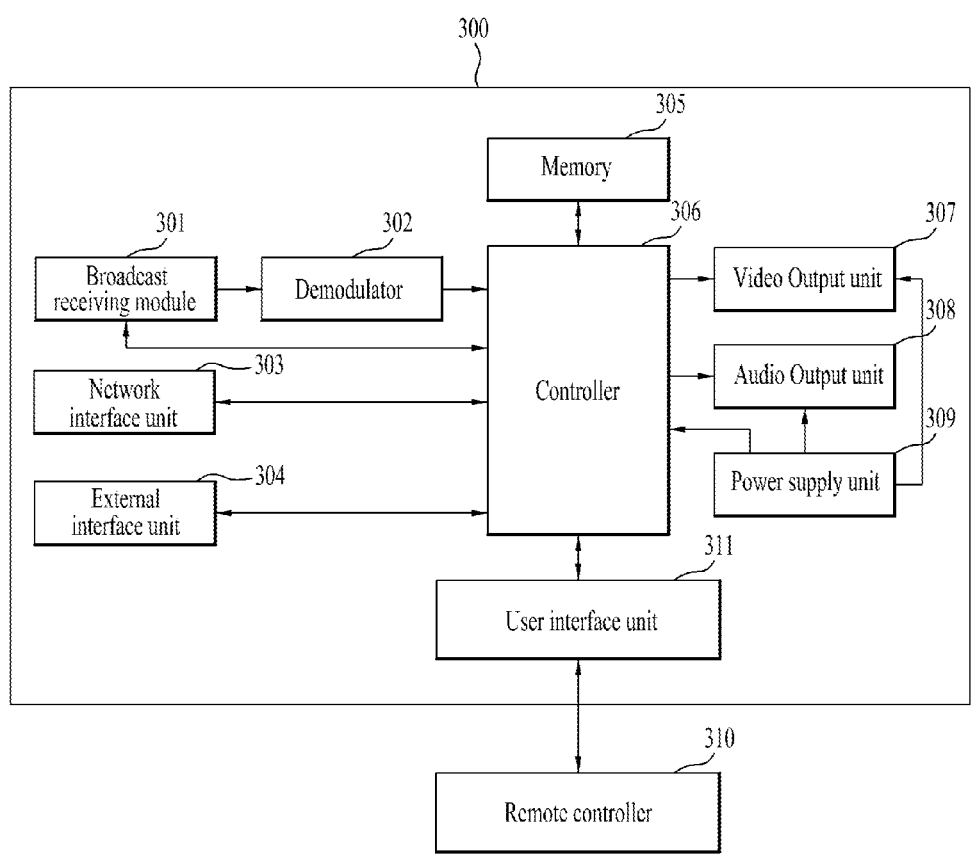
FIG. 3 illustrates a detailed block view showing configuration modules of a client according to an exemplary embodiment of the present invention.

FIG. 3 illustrates a detailed block view showing configuration modules of a client according to an exemplary embodiment of the present invention.

As shown in FIG. 3, the client 300 according to an exemplary embodiment of the present invention consists of a broadcast receiving module 301, a demodulator 302, a network interface 303, an external device interface 304, a memory 305, a controller 306, a video output unit 307, an audio output unit 308, a power supply unit 309, and a user interface 311. Meanwhile, the client 300 is designed to perform data communication with a remote controller 310.

The broadcast receiving module 301 may, for example, be designed as a radio frequency (RF) tuner, or may be designed as an interface capable of receiving broadcast data from an external device, such as a set-top box (STB).

For example, the broadcast receiving module 301 may receive an RF broadcast signal of a single carrier respective to an Advanced Television System Committee (ATSC) method, or the broadcast receiving module 301 may receive an RF broadcast signal of a multi-carrier respective to a Digital Video Broadcasting (DVB) method.

The demodulator 302 receives a digital intermediate frequency (DIF) signal, which is converted in the broadcast receiving module 301, and then perform demodulation.

For example, in case the DIF signal being outputted from the broadcast receiving module 301 corresponds to the ATSC method, the demodulator 302 may perform 8-Vestigal Side Band (8-VSB) demodulation. Additionally, the demodulator 302 may also perform channel decoding.

The external device interface 304 corresponds to an interface enabling data communication to be performed between an external device and the client 300. The external device interface 304 may be connected to an external device, such as a Digital Versatile Disc (DVD) player, a Blu-ray player, a gaming device, a camera, a camcorder, a computer (or notebook (or laptop) computer), an STB, and so on, via wired and/or wireless connection. The external device interface 304 delivers (or transports) video, audio, or data signals being inputted from an external source to the controller 306, wherein the video, audio, or data signals are inputted through the external device being connected to the external device interface 304. Additionally, the external device interface 304 may also output the video, audio, or data signals, which are processed by the controller 306, to the external device.

Herein, for example, the external device interface 304 may include a universal serial bus (USB) terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on.

The network interface 303 provides an interface for connecting the client 300 to a wireless and/or wired network including the Internet. In order to establish access to a wired network, the network interface 303 may, for example, be equipped with an Ethernet terminal, and so on, and, in order to establish access to a wireless network, for example, diverse communication standards, such as Wireless LAN (WLAN (or Wi-Fi)), Wireless broadband (Wibro), World Interoperability Microwave Access (Wimax), High Speed Downlink Packet Access (HSDPA), and so on, may be used.

The network interface 303 may transmit or receiver data to or from another user or another electronic device through the accessed network or through another network being linked to the accessed network.

The memory 305 may store programs for signal processing and control in the controller 306, or the memory 305 may store signal-processed video, audio or data signals. Additionally, the memory 305 may also perform a function of temporarily storing video, audio or data signals being inputted from the external device interface 304 or from the network interface 303. Furthermore, for example, the memory 305 may also store diverse types of OS, middleware, and platforms.

The user interface 311 either delivers a signal inputted by the user to the controller 306, or the user interface 311 transmits the signal received from the controller 306 to an external device (e.g., the remote controller 310). For example, in accordance with diverse communication methods, such as a RF communication method, an Infrared (IR) communication method, and so on, the user interface 311 is designed to receive control signals corresponding to power on/off, channel selection, screen settings, and so on, from the remote controller 310 and to process the received control signals, or the user interface 311 is designed to transmit control signals received from the controller 306 to the remote controller 310.

The controller 306 may demultiplex a stream being inputted through the broadcast receiving module 301, the demodulator 302, the network interface 303, or the external device interface 304, or the controller 306 may process the demultiplexed signals, so as to create and output signals for video or audio output. The controller 306 will be described in more detail later on with reference to FIG. 4.

The video output unit 307 converts each of the video signal, data signal, OSD signal, and so on, which are processed by the controller 306, or converts each of the video signal, data signal, and so on, which are received from the external device interface 304, to R, G, B signals, so as to generate a drive signal. The video output unit 307 may correspond to any one of a PDP, LCD, OLED, flexible display, 3-dimensional (3D) display, and so on.

The audio output unit 308 receives an audio-processed signal, which is processed by the controller 306, e.g., stereo signal, 3.1 channel signal, or 5.1 channel signal, and outputs the received signal as sound. Herein, the audio output unit 308 may be implemented as diverse forms of speakers.

Additionally, the power supply unit 309 supplies the corresponding power throughout the entire client 300. More specifically, the power supply unit 309 may supply power to the controller 306, which may be implemented in the form of a System On Chip (SOC), and the power supply unit 309 may also supply power to the video output unit 307 for displaying images and to the audio output unit 208 for outputting audio (or sound).

Figure 4:
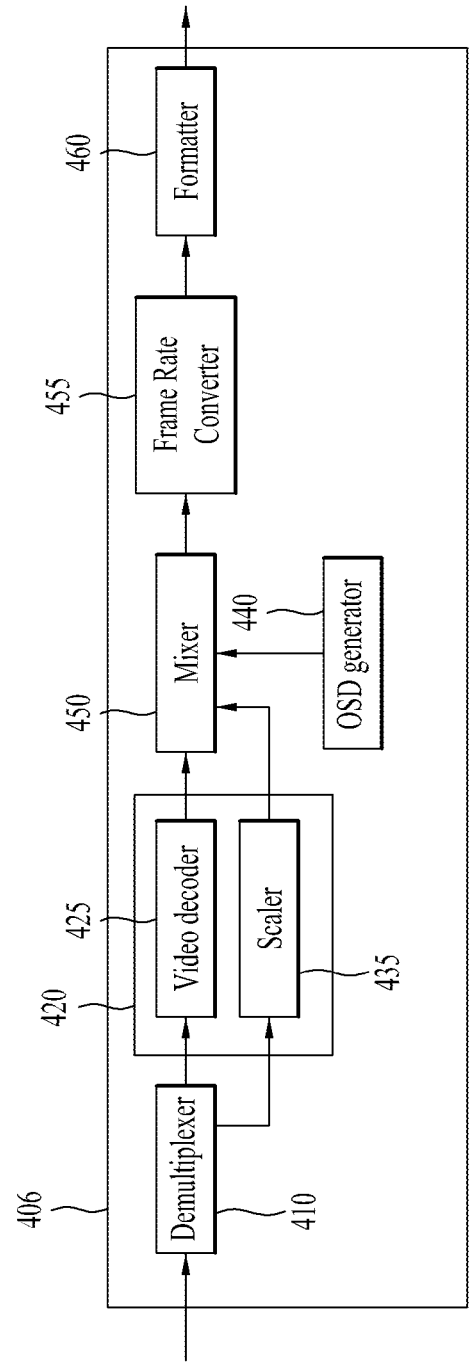
FIG. 4 illustrates a detailed block view of a controller shown in FIG. 3.

FIG. 4 illustrates a detailed block view of a controller shown in FIG. 3.

As shown in FIG. 4, the controller 406 of the client includes a demultiplexer 410, an image processing unit 420, an OSD generator 440, a mixer 450, a frame rate converter 455, a formatter 460, and so on. Additionally, the scope of the present invention may also include designing the system, so that the display device can further include a sound processing unit (not shown) and a data processing unit (not shown).

The demutliplexer 410 demultiplexes an inputted stream. For example, when an MPEG-2 TS is inputted, the demultiplexer 310 demultiplexes the inputted MPEG-2 TS and may split (or divide) the demultiplexed MPEG-2 TS into image (or video), sound (or audio), and data signals.

The image processing unit 420 may perform image processing on the demultiplexed image signal. In order to do so, the image processing unit 420 may be equipped with an image decoder 425 and a scaler 435. The image decoder 425 decodes the demultiplexed image signal, and the scaler 435 performs scaling on the resolution of the decoded image signal, so that the decoded image signal can be outputted by the video output unit. Thereafter, the image signal that is decoded by the image processing unit 420 is inputted to the mixer 450.

The OSD generator 440 generates an OSD signal in accordance with the user's input or by itself. Accordingly, the mixer 450 may mix the OSD signal, which is generated from the OSD generator 440, and the decoded image signal, which is image-processed by the image-processing unit 420.

The mixed signal is provided to the formatter 460. By mixing the decoded broadcast image signal or the externally inputted signal with the OSD signal, the OSD may be displayed by being overlaid on the broadcast image or the externally inputted image.

The frame rate converter (FRC) 455 may convert the frame rate of the image that is being inputted. For example, the FRC 455 may convert the frame rate of 60 Hz to 120 Hz or 240 Hz.

Additionally, the formatter 460 receives an output signal of the FRC 455. Thereafter, the formatter 460 may convert the signal format, so that the signal can be adequate for the video output unit, and may then output the converted signal. For example, the formatter 460 may output R, G, and B data signals, and such R, G, and B data signals may be outputted via low voltage differential signaling (LVDS) or mini-LVDS.

Figure 5:
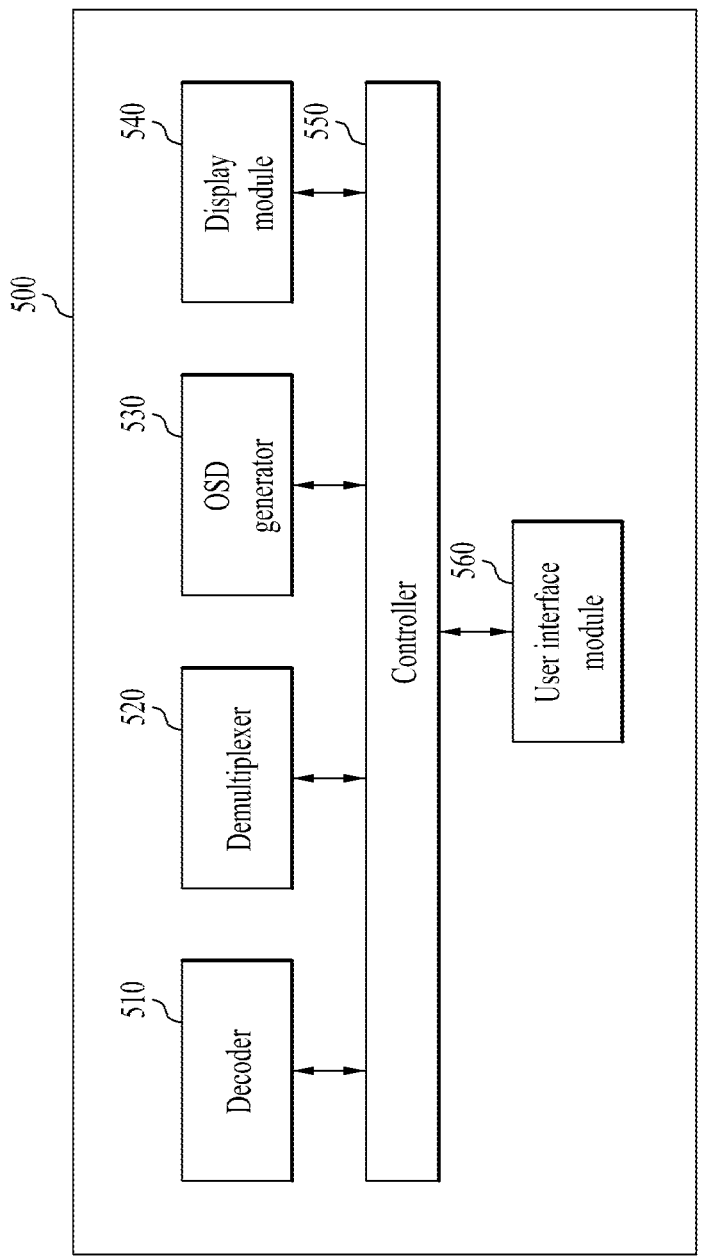
FIG. 5 illustrates a detailed block view showing configuration modules of a client according to another exemplary embodiment of the present invention.

FIG. 5 illustrates a detailed block view showing configuration modules of a client according to another exemplary embodiment of the present invention. Herein, FIG. 5 may be interpreted with reference to FIG. 3 and FIG. 4, which are described above, and the scope of the present invention shall include adding, modifying, or deleting some of the modules.

Hereinafter, it will be assumed that the video data and metadata are being transmitted through the above-described server, which is shown in FIG. 1 or FIG. 2.

At this point, as shown in FIG. 5, the client 500 processing multiple channel information includes a decoder 510, a demultiplexer 520, an OSD generator 530, a display module 540, a controller 550, and a user interface module 560. Evidently, the scope of the present invention shall include adding, modifying, or deleting some of the modules, whenever required by anyone skilled in the art.

The decoder 510 is designed to decode encoded data, which are received from the server. The demultiplexer 520 demultiplexes video data, audio data and metadata for each channel from the decoded data.

The controller 550 is designed to extract video data, audio data and metadata for a channel group for on-screen display (OSD) data, the channel group including one or more channels, and the OSD generator 530 is designed to generate OSD data based on the extracted video data, audio data and metadata for the channel group.

Additionally, the display module 540 is designed to display the generated OSD data on a predetermined section along with a broadcast screed of a currently selected channel. This will hereinafter be described in more detail with reference to FIG. 7 or FIG. 9.

Meanwhile, the user interface module 560 is designed to receive a command designating the number of channel belonging to the channel group, and this will be described in more detail with reference to FIG. 10 or FIG. 11.

Furthermore, the controller 550 divides the predetermined section in accordance with the designated number of channels, and, then, based upon the designated number of channels and profile information, the controller 550 detects a channel number belonging to the channel group. Thereafter, based upon the profile information, the controller 550 aligns (or positions) the position of each set of video data that is displayed within the predetermined section. This will be described in more detail later on with reference to FIG. 12.

Moreover, for example, the metadata may include at least one or more of information on a channel number, information on a program title, and information on a program duration. Additionally, for example, the client 500 corresponds to at least one of a DTV, an IPTV, a network TV, an HBBTV, a smart TV, and a mobile device.

FIG. 6 illustrates a process of blending a video user interface and metadata according to an exemplary embodiment of the present invention.

As described above with reference to FIG. 1 and FIG. 2, the server transmits video data, audio data and metadata for each channel to the client. Accordingly, as shown in (a) of FIG. 6, the client includes video data 610 for each channel in a processable format, wherein decoding and demultiplexing (or demuxing) processes are completed in the video data 610 for each channel.

Evidently, it is shown in (a) of FIG. 6 that video data respective to a total of 12 channels have been extracted. However, this is merely an example given, and, therefore, video data respective to a more extensive number of channels may be received and extracted. In light of the fact that this example is more dependent to the performance of the server rather than the performance of the client, it will be advantageous in that the performance of the client is not required to be upgraded.

Furthermore, as shown in (b) of FIG. 6, the client uses metadata 630 for each channel, wherein decoding and demultiplexing processes are completed in the metadata 630 for each channel, so as to set up in advance a sub-section 620 in which video data of a channel corresponding to the metadata 630 can be inserted.

Meanwhile, in the example shown in (b) of FIG. 6, although the metadata 630 corresponds only to an exemplary channel number and an exemplary title information of a broadcast program, the scope of the present invention may also include designing the metadata to include the remaining time of the current broadcast program, the overall running time, actor information, and so on. Furthermore, in the example shown in (b) of FIG. 6, although it is shown that metadata respective to only 4 channels are extracted, whenever required by anyone skilled in the art, the present invention may also be designed to extract metadata respective to a larger number of channels or to extract metadata respective to a smaller number of channels.

Figure 7:
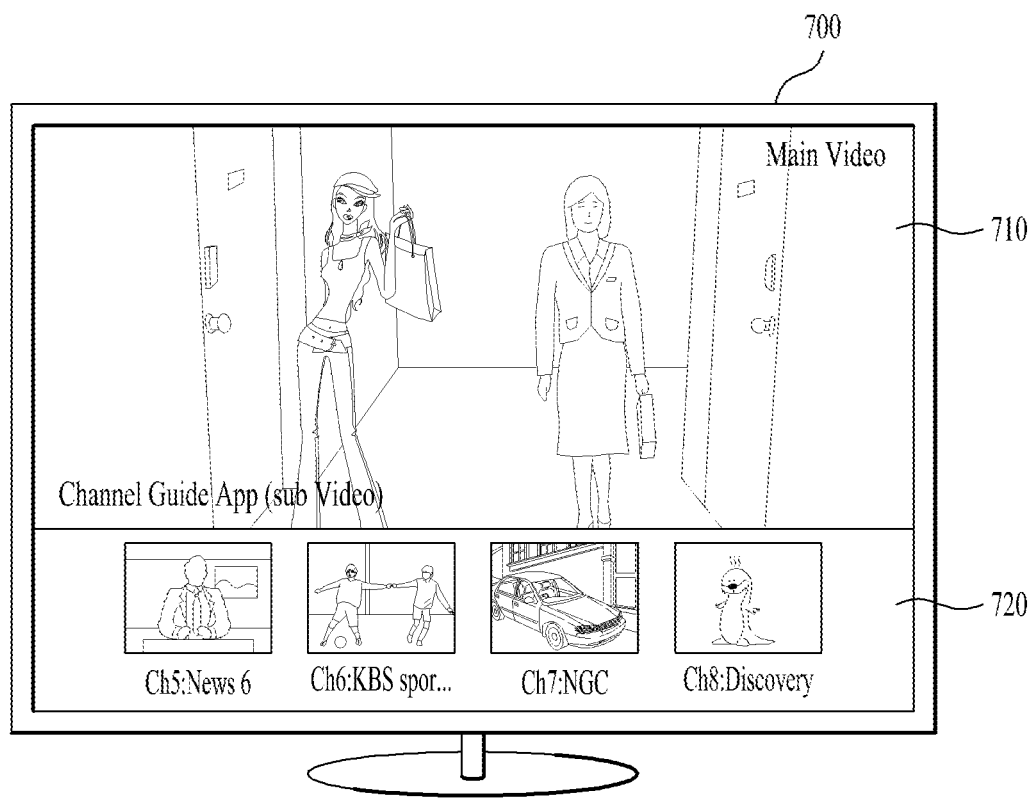
FIG. 7 illustrates a screen of a client being outputted (or displayed) in accordance with the process shown in FIG. 6.

FIG. 7 illustrates a screen of a client being outputted (or displayed) in accordance with the process shown in FIG. 6. Hereinafter, according to the exemplary embodiment of the present invention, a process of blending (or merging) the video data, audio data and the metadata for each channel and outputting the blended data will hereinafter be described in detail with reference to FIG. 6 and FIG. 7.

First of all, the video data shown in (a) of FIG. 6 and the metadata shown in (b) of FIG. 6 are blended and, then, the blended data are outputted to the display screen shown in FIG. 7.

More specifically, the client 700 according to the exemplary embodiment of the present invention outputs the current broadcast screen 710 on the entire display screen. Then, in case a user request is received, or in accordance with default settings, the client 700 provides a sub-section 720 respective to other channels.

The sub-section 720 is configured of a format including the video data and the metadata described above with reference to FIG. 6. For example, video data, audio data and metadata (i.e., channel information, broadcast program information) of other neighboring channels (Ch. 5, Ch. 6, Ch. 7, and Ch. 8) of the current broadcast screen 710 are displayed on the sub-section 720.

Furthermore, according to another exemplary embodiment of the present invention, the present invention may be designed so that the number of channels included in the sub-section 720 can be designated by the user. And, this will be described in more detail later on with reference to FIG. 10 and FIG. 11.

Additionally, according to yet another exemplary embodiment, the present invention may also be designed so that a group of specific channels being included in the sub-section 720 can be automatically extracted. And, this will be described in more detail later on with reference to FIG. 12.

FIG. 8 illustrates a process of blending a video user interface and metadata according to another exemplary embodiment of the present invention. In FIG. 6, it was assumed that the video data for each channel are received and process. However, in FIG. 8, an exemplary embodiment of providing a video user interface (UI) respective to an application, which is independent from channels, broadcasting, and programs, will be described.

The server, which is shown in FIG. 1 and FIG. 2, may be designed to transmit video data, audio data and metadata of a recommended application that can be applied to a smart TV, instead of transmitting channel-related data, to the client. Therefore, as shown in (a) of FIG. 8, the client includes video data 810, 820, 830, and 840 respective to each application in a processable format, wherein decoding and demultiplexing processes are completed in the video data 810, 820, 830, and 840 for each channel.

Evidently, it is shown in (a) of FIG. 8 that video data respective to a total of 4 applications (or advertisements) have been extracted. However, this is merely an example given, and, therefore, video data respective to a larger number of applications may be received and extracted. In light of the fact that this example is more dependent to the performance of the server rather than the performance of the client, it will be advantageous in that the performance of the client is not required to be upgraded.

Furthermore, as shown in (b) of FIG. 8, the client uses metadata 811, 821, 831, and 841 respective to each application, wherein decoding and demultiplexing processes are completed in the metadata 811, 821, 831, and 841 respective to each application, so as to set up in advance a sub-section in which video data of a specific application corresponding to each set of the metadata 811, 821, 831, and 841 can be inserted.

Figure 9:
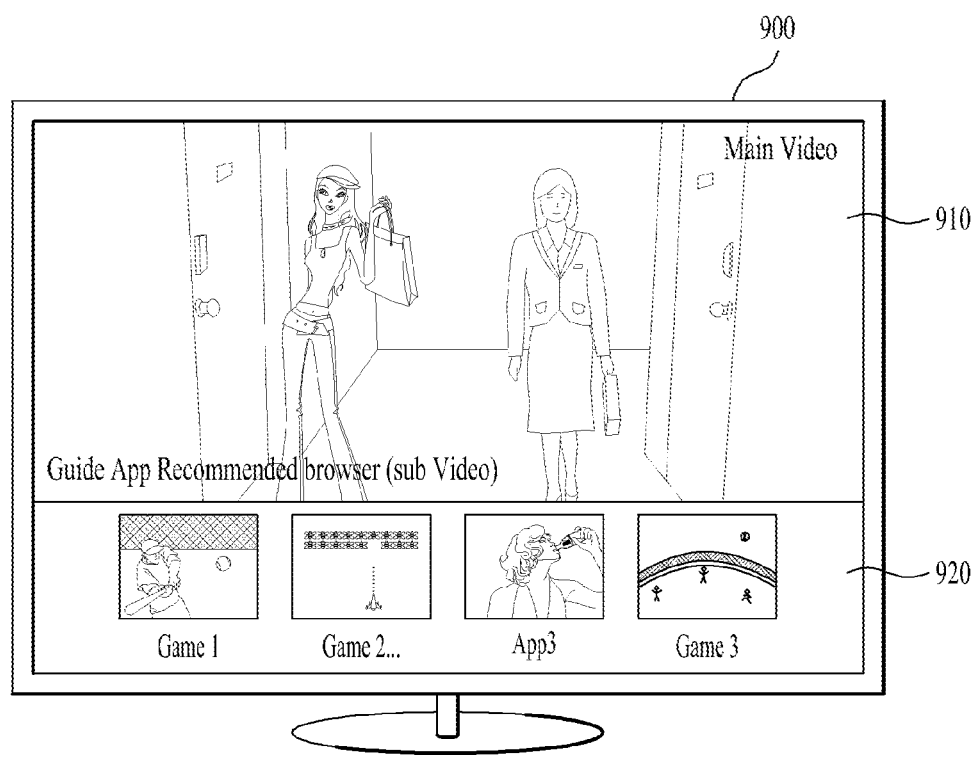
FIG. 9 illustrates a screen of a client being outputted (or displayed) in accordance with the process shown in FIG. 8.

FIG. 9 illustrates a screen of a client being outputted in accordance with the process shown in FIG. 8. Hereinafter, according to the exemplary embodiment of the present invention, a process of blending the video data, audio data and the metadata for each application and outputting the blended data will hereinafter be described in detail with reference to FIG. 8 and FIG. 9.

First of all, the video data shown in (a) of FIG. 8 and the metadata shown in (b) of FIG. 8 are blended and, then, the blended data are outputted to the display screen shown in FIG. 9.

More specifically, the client 900 according to the exemplary embodiment of the present invention outputs the current broadcast screen 910 on the entire display screen. Then, in case a user request is received (e.g., when a remote controller signal requesting a moving picture image of a recommended application is received), or in accordance with default settings, the client 900 provides a sub-section 920 respective to a recommended application based upon a predetermined standard.

The sub-section 920 is configured of a format including the video data and the metadata described above with reference to FIG. 8. For example, the sub-section 920 may correspond to a concept completely independent from the channel of the current broadcast screen 910, or the sub-section 920 may be designed to display a recommended application that is related to the current broadcast screen 910.

Furthermore, when the user selects a specific set of video data of the sub-section 920 by using a remote controller, and so on, audio data corresponding to the video data may be outputted through the speaker of the client 900. More specifically, while audio data corresponding to the current broadcast screen 910 are being outputted through the speaker, when the client 900 receives a signal of the user selecting a specific set of video data displayed on the sub-section 920 by using the remote controller, and so on, the client 900 may stop the output of the audio data corresponding to the current broadcast screen 910 and may output the audio data corresponding to the selected specific video data through the speaker.

Figure 10:
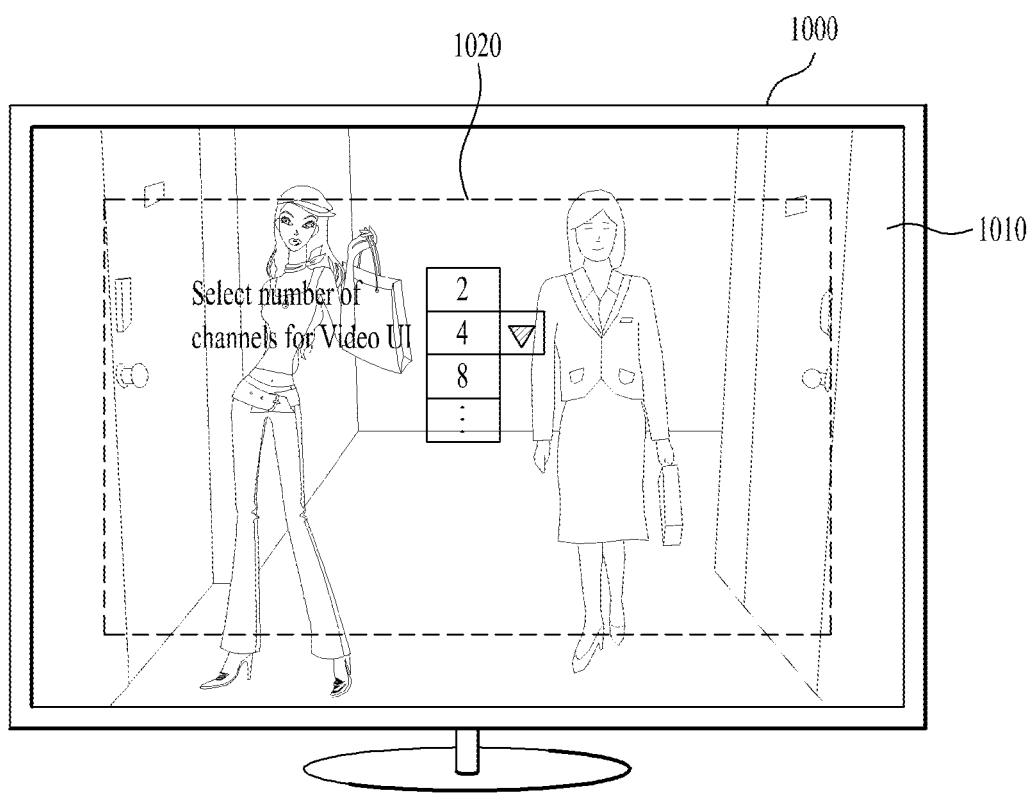
FIG. 10 illustrates a first option available for set-up with respect to a video user interface according to an exemplary embodiment of the present invention.

FIG. 10 illustrates a first option available for set-up with respect to a video user interface according to an exemplary embodiment of the present invention. Hereinafter, referring to FIG. 10, a first option that can be set up by the user with respect to a video user interface according to an exemplary embodiment of the present invention will be described in detail.

In FIG. 7, it was assumed that the number of channels being displayed on the sub-section 720 is fixed to 4 channels. However, the user may feel the need to verify the video data, audio data and metadata of a larger number of channels or the video data and metadata of a smaller number of channels. Therefore, in order to resolve such problem, the present invention proposes the option shown in FIG. 10.

The client 1000 according to the exemplary embodiment of the present invention first outputs a broadcast screen 1010, and, then, when a user request is received (e.g., when a short cut button of the remote controller is pressed), the client 1000 displays an option 1020 that may edit a video user interface. Herein, the option 1020 and the broadcast screen 1010 may be designed to be displayed in an overlaying (or overlapping) format.

Accordingly, the user may designate the number of channels being outputted to the option 1020, or the user may also additionally designate the number of channels that are not being displayed.

Meanwhile, even in case the user has designated the number of displayed channels through the option 1020, the exemplary embodiment of the present invention requires a process of specifically deciding which specific channel group is to be included in the video user interface (i.e., sub-section 720). This will be described in more detail later on with reference to FIG. 11 and FIG. 12.

Figure 11:
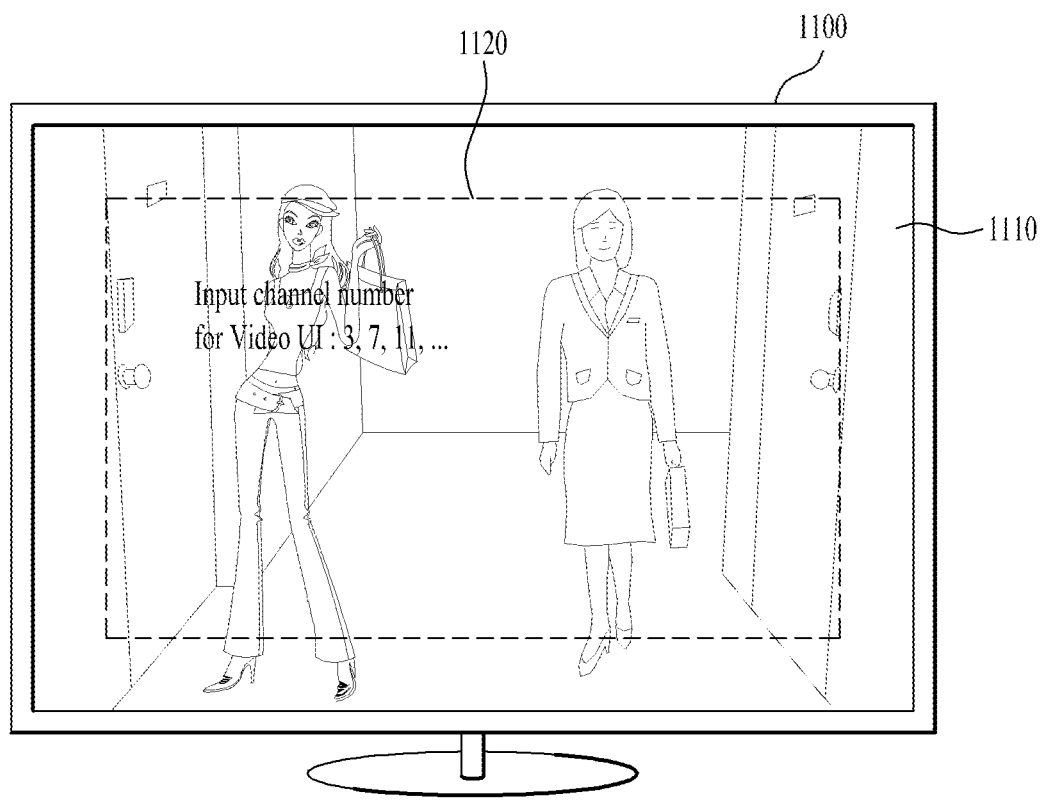
FIG. 11 illustrates a second option available for set-up with respect to a video user interface according to an exemplary embodiment of the present invention.

FIG. 11 illustrates a second option available for set-up with respect to a video user interface according to an exemplary embodiment of the present invention.

First of all, if the number of channels is decided in FIG. 10, the video user interface may be automatically configured of neighboring channels of the channel corresponding to the current broadcast screen 1110. However, in some cases, the neighboring channels configuring the video user interface may be different from the channel, which the user wishes to verify, and, in such case, it may be disadvantageous in that the user may have to go through a complicated process in order to access the wanted channel group.

Therefore, as shown in FIG. 11, the client 1100 according to the exemplary embodiment of the present invention provides an option 1120 that may particularly specify a channel number that is included in the video user interface (e.g., sub-section 720 shown in FIG. 7).

Furthermore, the scope of the present invention may include limiting the number range of the channel numbers that can be inputted through the option 1120, shown in FIG. 11, in accordance with the number of channels, which is decided in FIG. 10.

FIG. 12 illustrates a database that is stored in a memory of the client according to an exemplary embodiment of the present invention. In case the number of channels belonging to the video user interface is decided in FIG. 10, the example of automatically extracting a specific channel group, which is preferred by the user, will hereinafter be described in more detail with reference to FIG. 12.

As shown in FIG. 12, the exemplary embodiment of the present invention is designed to store profile information related to specific channels respective to each time period (or time period specific channels) of the client in the memory. Evidently, although the user is not differentiated in FIG. 12, if the client corresponds to a client that can be logged into, a single client may manage a profile database of multiple users.

Channel 1 (Ch. 1) is accessed 2 times and the total viewing time is 40 minutes. Channel 2 (Ch. 2) is accessed 3 times and the total viewing time is 1 hour 25 minutes. Channel 3 (Ch. 3) is accessed 1 time and the total viewing time is 2 hours. And, Channel 4 (Ch. 4) is accessed 5 times and the total viewing time is 17 minutes.

At this point, a method for selecting a specific channel group being included in the video user interface is designed to be based upon priority levels. In FIG. 12, the priority level is calculated by a single factor, which corresponds to the viewing time. However, the scope of the present invention also includes selecting a specific channel group by adding the number of access times and the viewing time after adding a constant weight to the two factors.

In case of using the database shown in FIG. 12, it is advantageous in that the user is not required to separately designate a specific channel group, which is included in the video user interface, and it is also advantageous in that data processing can be realized at a faster rate.

Figure 13:
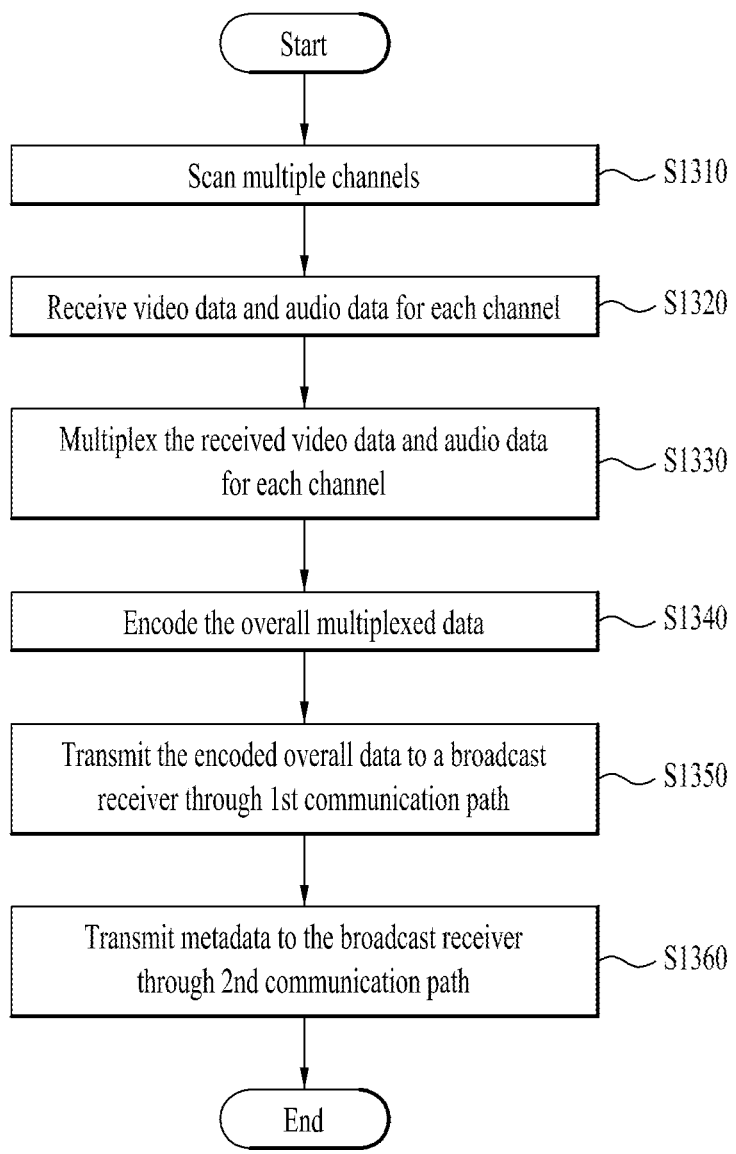
FIG. 13 illustrates a detailed flow chart showing a control method of a server according to an exemplary embodiment of the present invention.

FIG. 13 illustrates a detailed flow chart showing a control method of a server according to an exemplary embodiment of the present invention. Hereinafter, the control method of the server according to the exemplary embodiment of the present invention will be sequentially described in detail with reference to FIG. 13. Evidently, whenever required by anyone skilled in the art, the scope of the present invention shall include adding, modifying, or deleting some of the process steps.

The server is designed to scan multiple channels (S1310) and to receive video data and audio data for each channel (S1320). Thereafter, the server multiplexes the received video data and audio data for each channel (S1330), and, then, the server encodes the overall multiplexed data (S1340).

The server transmits the overall encoded data to a broadcast receiver through a first communication path (S1350), and the server transmits metadata to the broadcast receiver through a second communication path (S1360).

In the step of performing multiplexing (S1330), the metadata for each channel are multiplexed along with the video data and audio data for each channel. This has already been fully described above with reference to FIG. 1.

According to another exemplary embodiment of the present invention, the first communication path and the second communication path are identical, and, for example, each of the communication paths may be designed as an Ethernet instead of a broadcast channel, thereby enhancing the data processing rate.

Moreover, for example, the metadata may include at least one or more of information on a channel number, information on a program title, and information on a program duration.

And, FIG. 14 illustrates a detailed flow chart showing a control method of a client according to an exemplary embodiment of the present invention. Hereinafter, the control method of the client according to the exemplary embodiment of the present invention will be sequentially described in detail with reference to FIG. 14. Evidently, whenever required by anyone skilled in the art, the scope of the present invention shall include adding, modifying, or deleting some of the process steps.

The client decodes the encoded data, which are received from the server (S1410), and, then, the client demultiplexes the video data, audio data and metadata for each channel from the decoded data (S1420).

Thereafter, the client extracts video data, audio data and metadata for a channel group (S1430). And, afterwards, the client generates OSD data based on the extracted video data, audio data and metadata for the channel group (S1440).

Subsequently, the client displays the generated OSD data on a predetermined section along with the broadcast screen of the currently selected channel (S1450). This has already been described above in detail with reference to FIG. 6 to FIG. 9.

Although it is not shown in FIG. 14, the present invention may be designed to further include a step of receiving a command designating the number of channels belonging to the channel group, and this has been described above with reference to FIG. 10.

Additionally, although it is not shown in FIG. 14, the method according to the exemplary embodiment of the present invention is designed to further include a step of dividing the predetermined section in accordance with the designated number of channels, a step of detecting a channel number belonging to the channel group based upon the designated number of channels and the profile information, and a step of aligning positions of video data being displayed in the predetermined section based upon the profile information. And, this has been described above with reference to FIG. 10 to FIG. 12.

Therefore, according to the above-described exemplary embodiments of the present invention, even in case of a client being equipped only with a single tuner, it may be advantageous in that video data of other channels can be verified in real-time. Furthermore, since the overall channels are scanned and the video data, audio data and metadata for each channel are managed by a separate server, it may be technically advantageous in that backward compatibility with the conventional client can be maintained.

The device and control method according to the exemplary embodiment of the present invention may be configured as another exemplary embodiment of the present invention by combining any one of the above-described drawings with another one of the above-described drawings. Alternatively, details of the present invention that are apparent and evident to anyone skilled in the art may also be combined so as to configure another exemplary embodiment of the present invention. And, this shall also be included in the scope of the present invention.

Meanwhile, an operation method of an electronic device according to the present invention may be implemented as a processor-readable code in a storage medium, which can be read by the processor being equipped in the electronic device. The processor-readable storage medium includes all types of recording devices that are configured to store data that can be read by a processor. Examples of the processor-readable storage medium may include a ROM, a RAM, a CD-ROM, an electro-magnetic tape, a floppy disk, an optical data storage device, and so on. Furthermore, the processor-readable storage medium may also include storage media that can be realized in the form of carrier waves, such as transmission via the Internet. Finally, the processor-readable storage medium may be dispersed to a computer system that is connected via network, thereby being capable of storing and executing processor-readable codes by using a dispersion method.

As described above, the server and client processing multiple sets of channel information and the controlling method of the same have the following advantages. An exemplary embodiment of the present invention provides a separate management server for providing channel information optimized for the client (i.e., client-optimized channel information). And, another exemplary embodiment of the present invention provides a technology for preventing data processing overload of the client from occurring in advance during a procedure of providing a considerable amount of channel information to the client. Finally, a further exemplary embodiment of the present invention defines a solution for automatically grouping channels preferred by the user, and for providing multiple sets of channel information in a user interface format of video data and not simply providing supplemental information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A smart television for processing data, the smart television comprising:
   a tuner configured to receive broadcast data including audio and video data;
   a network interface configured to receive the video data and metadata of each recommended application that can be applied to the smart television;
   a display module configured to display a current broadcast screen based on the video data included in the received broadcast data; and
   a controller configured to set up in advance a video user interface in which video data of a specific recommended application corresponding to each of the metadata can be inserted, and blend the video data and the metadata for each respective application of the recommended applications,
   wherein the controller further controls the display module to display the video user interface while displaying the current broadcast screen in response to a first remote controller signal requesting each recommended application from a remote controller,
   wherein the video user interface includes multiple sub-sections, further the blended video data is displayed with the metadata on at least one sub-section among the multiple sub-sections,
   wherein the controller further controls the display module to display a first option for editing the video user interface in response to a second remote controller signal from the remote controller, further the first option and the broadcast screen are displayed in an overlaying format, and the first option is used to determine a number of channels within the video user interface, and
   wherein the controller further controls the display module to display a second option if the number of channels within the video user interface is determined, further the second option is displayed together with the current broadcast screen, and the second option specifies a specific channel group including a channel number that is included in the video user interface.

2. The smart television of claim 1, further comprising:
   a memory configured to store profile information,
   wherein the controller is further configured to align the position of each of the video data that is displayed within the video user interface based on a profile information stored in the memory.

3. The smart television of claim 2, wherein the profile information further includes access times, viewing time or priority level on each of a specific channel in the specific channel group, further the metadata corresponds to a name of the recommended application or a type of the recommended application.

* * * * *